United States Patent
Kim

(10) Patent No.: US 9,858,029 B2
(45) Date of Patent: Jan. 2, 2018

(54) VIDEO WALL SECURITY SYSTEM AND METHOD

(71) Applicant: Hanwha Techwin Co., Ltd., Changwon-si (KR)

(72) Inventor: Dae Sang Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 16 days.

(21) Appl. No.: 15/064,983

(22) Filed: Mar. 9, 2016

(65) Prior Publication Data

US 2016/0266861 A1 Sep. 15, 2016

(30) Foreign Application Priority Data

Mar. 12, 2015 (KR) .................. 10-2015-0034314

(51) Int. Cl.
*G09G 5/00* (2006.01)
*G06F 3/14* (2006.01)
*H04N 7/18* (2006.01)
*H04N 9/31* (2006.01)

(52) U.S. Cl.
CPC ........... *G06F 3/1446* (2013.01); *G09G 5/003* (2013.01); *H04N 7/181* (2013.01); *H04N 9/3147* (2013.01); *G09G 2370/022* (2013.01)

(58) Field of Classification Search
CPC ....... G06F 3/1446; G09G 5/003; H04N 7/181
See application file for complete search history.

(56) References Cited

U.S. PATENT DOCUMENTS

| | | | |
|---|---|---|---|
| 6,611,241 B1 * | 8/2003 | Firester | H04N 9/12 345/1.1 |
| 2002/0116539 A1 | 8/2002 | Bryczkowski et al. | |
| 2010/0109974 A1 | 5/2010 | Dunn et al. | |
| 2012/0098969 A1 | 4/2012 | Wengrovitz et al. | |
| 2014/0365980 A1 * | 12/2014 | Morrison | G06F 3/017 715/863 |
| 2016/0093336 A1 * | 3/2016 | Laska | G06K 9/00711 386/241 |

FOREIGN PATENT DOCUMENTS

| KR | 10-2009-0048207 A | 5/2009 |
|---|---|---|
| KR | 10-2011-0050237 A | 5/2011 |
| KR | 10-2013-0010657 A | 1/2013 |

* cited by examiner

*Primary Examiner* — Kevin M Nguyen
(74) *Attorney, Agent, or Firm* — Sughrue Mion, PLLC

(57) ABSTRACT

A video wall security system and a video wall security method are provided. The video wall security system includes at least one processor to implement a central controller configured to receive, from a monitoring system, an identifier of a camera and a video stream, and generate layout setting information of a video wall to control a layout of the video wall, based on the identifier, a gateway configured to generate mapping information based on the layout setting information of the central controller, an internet protocol (IP) wall controller configured to transmit the mapping information to each of screens of the video wall, and control the screens to load the video stream based on the identifier, and a decoder configured to decode the loaded video stream, and display the decoded video stream on the screens.

20 Claims, 16 Drawing Sheets

VIDEO WALL SECURITY SYSTEM AND METHOD

CROSS-REFERENCE TO RELATED APPLICATIONS

This application claims priority from Korean Patent Application No. 10-2015-0034314, filed on Mar. 12, 2015, in the Korean Intellectual Property Office, the disclosure of which is incorporated herein by reference in its entirety.

BACKGROUND

1. Field

Apparatuses and methods consistent with exemplary embodiments relate to a video wall security system and a video wall security method, and more particularly, to a video wall security system and a video wall security method that control a video wall including a plurality of screens using an internet protocol (IP) wall controller.

2. Description of the Related Art

In general, a security system is installed in most buildings, and a monitoring personnel who monitors the system resides near the security system. The security system is provided with a video wall so that a monitoring staff monitors the video wall in real time.

The video wall system is a monitoring system of a security room that allows the monitoring personnel to monitor the security system of the entire building at a glance and to perform an immediate action when a situation occurs, and the video wall is configured so that a plurality of monitors is disposed on a plane to operate like a single monitor having a large screen.

As an example of the video wall system, a plurality of liquid crystal display (LCD) screens is combined to achieve a single large screen and receives input of various multimedia image signals from a computer, an IP camera and a closed-circuit television (CCTV) to display the image signals on the large screen formed by the combination of the LCD screen and the like. Thus, when a single image is displayed to be enlarged by a plurality of screens, a user can recognize an image displayed on the screen at a glance.

FIGS. 1 and 2 are diagrams each illustrating a configuration of a related art video wall system.

Referring to FIG. 1, a controller 11 transmits input/output matrix information to a red-green-blue (RGB) Matrix Switcher 15, and transmits monitor merge information to a video matrix 17.

That is, the controller 11 transmits a command to both locations of the RGB Matrix Switcher 15 and the video matrix 17, and performs source changes and a merge/unmerge function to display an image on a video wall 5.

However, in the case of the CCTV control image, the image of a video source 13 is changed using the wall control software different from the wall control software of the controller 11.

Further, referring to FIG. 2, although it is similar to the structure of FIG. 1, this is changed so that the communication between video wall devices 18 and 19 is performed by a transport control protocol (TCP) to facilitate the development.

However, the image of the video source 13 is changed using the software different from the wall control software of the controller 11 in the same manner as FIG. 1.

Therefore, in the related art video wall system, there are drawbacks of each monitor control (Merge, Unmerge), a source control representing the type of sources, and a separation of the CCTV image division control, and because the system requests and processes the command accordingly, there is a problem causing great inconvenience to the operator.

Further, when enlarging the screen in each monitor of the video wall, because the screen is enlarged, while the resolution of the monitor is maintained without change, the pixels are also enlarged with the enlargement of the screen, and there is no change in the resolution that is actually observed.

Further, as the number of monitors increases, the number of images capable of being expressed for each monitor decreases, and to use the controller 11 and the Matrix Switcher 15, the prices increase due to an increase in the lines that connect each device. For this reason, there has been an increasing demand for the function (merge) that simply merges the screen in the units of the monitor without the use of the controller 11.

SUMMARY

Exemplary embodiments may address at least the above problems and/or disadvantages and other disadvantages not described above. However, the exemplary embodiments are not required to overcome the disadvantages described above, and may not overcome any of the problems described above.

One or more exemplary embodiments provide a video wall security system and a video wall security method that allow the size of the screen to be freely adjusted and improve the user's convenience, by controlling the video wall using an IP wall controller.

One or more exemplary embodiments provide a video wall security system and a video wall security method that can use all the original resolution of the monitor and can improve the sharpness of the screen, by excluding the phenomenon such as an enlargement of the pixel, even when performing the merge operation between the monitors.

One or more exemplary embodiments provide a video wall security system and a video wall security method that reduce the wiring to reduce the installation costs and can improve the utilization efficiency with the simplification of the configuration, by controlling each monitor of the video wall including the plurality of monitors through a single IP wall controller.

According to an aspect of an exemplary embodiment, there is provided a video wall security system including at least one processor to implement a central controller configured to receive, from a monitoring system, an identifier of a camera and a video stream, and generate layout setting information of a video wall to control a layout of the video wall, based on the identifier, a gateway configured to generate mapping information based on the layout setting information of the central controller, an internet protocol (IP) wall controller configured to transmit the mapping information to each of screens of the video wall, and control the screens to load the video stream based on the identifier, and a decoder configured to decode the loaded video stream, and display the decoded video stream on the screens.

The gateway may be further configured transmit a codec to the decoder, and the decoder may be further configured to decode the video stream based on the codec.

The layout of the video wall may include a monitor layout to be displayed on each of the screens, and a wall layout to be displayed on all of the screens.

The video wall security system may further include a client controller configured to generate layout setting information of the video wall to control the layout of the video wall, and the gateway may be further configured to generate the mapping information based on at least one among the layout setting information of the central controller and the layout setting information of the client controller.

The layout of the video wall may include a free layout in which the layout of the video wall is freely set, without being restrained by a bezel of any among the screens.

The client controller may be further configured to, in the free layout, receive an input specifying a region to which the video stream is to be output, and transmit, to the gateway, an identifier of a first monitor and an identifier of a second monitor in which the region is specified, and information of the region, and the gateway may be further configured to set coordinates of the region in each of the first monitor and the second monitor based on the identifier of the first monitor, the identifier of the second monitor, and the information of the region, to generate the mapping information so that separate images output from the first monitor and the second monitor are displayed as a single image.

The client controller may be further configured to output an image to be output from the video wall in advance based on the layout setting information of the client controller.

The video wall may include a first video wall and a second video wall arranged in a row, the gateway may include a first gateway and a second gateway, the client controller may be further configured to receive an input specifying a region to which the video stream is to be output, and transmit, to the first gateway and the second gateway, information of the region, and the first gateway and the second gateway may be further configured to set coordinates of the region in each of the first video wall and the second video wall, respectively, based on the information of the region, to generate first mapping information and second mapping information so that respective separate images output from the first video wall and the second video wall are displayed as a single image.

The IP wall controller may include a first IP wall controller and a second IP wall controller, the first gateway and the second gateway may be further configured to transmit the first mapping information and the second mapping information to the first IP wall controller and a second wall IP controller, respectively, the first IP wall controller may be configured to control the first video wall to load a first portion of the video stream based on the first mapping information, and the second IP wall controller may be configured to control the second video wall to load a second portion of the video stream based on the second mapping information.

The gateway may include gateways configured to respectively process different types of layout setting information for layout types of the video wall.

According to an aspect of another exemplary embodiment, there is provided a video wall security method including receiving, by a central controller, an identifier of a camera and a video stream from a monitoring system, generating, by the central controller, layout setting information of a video wall to control a layout of the video wall, based on the identifier, generating, by a gateway, mapping information based on the layout setting information of the central controller, transmitting, by an internet protocol (IP) wall controller, the mapping information to each of screens of the video wall, controlling, by the IP wall controller, the screens to load the video stream based on the identifier, decoding, by a decoder, the loaded video stream, and displaying, by the decoder, the decoded video steam on the screens.

The video wall security method may further include transmitting, by the gateway, a codec to the decoder, and the decoding may include decoding, by the decoder, the video stream based on the codec.

The layout of the video wall may include a monitor layout to be displayed on each of the screens, and a wall layout to be displayed on all of the screens.

The video wall security method may further include generating, by a client controller, layout setting information of the video wall to control the layout of the video wall, and the generating the mapping information may include generating the mapping information based on at least one among the layout setting information of the central controller and the layout setting information of the client controller.

The layout of the video wall may include a free layout in which the layout of the video wall is freely set, without being restrained by a bezel of any among the screens.

The video wall security method may further include, in the free layout, receiving, by the client controller, an input specifying a region to which the video stream is to be output, transmitting, by the client controller to the gateway, an identifier of a first monitor and an identifier of a second monitor in which the region is specified, and information of the region, and setting, by the gateway, coordinates of the region in each of the first monitor and the second monitor based on the identifier of the first monitor, the identifier of the second monitor, and the information of the region, to generate the mapping information so that separate images output from the first monitor and the second monitor are displayed as a single image.

The video wall security method may further include outputting, by the client controller, an image to be output from the video wall in advance based on the layout setting information of the client controller.

The video wall may include a first video wall and a second video wall arranged in a row, the gateway may include a first gateway and a second gateway, and the video wall security method may further include receiving, by the client controller, an input specifying a region to which the video stream is to be output, transmitting, by the client controller to the first gateway and the second gateway, information of the region, and setting, by the first gateway and the second gateway, coordinates of the region in each of the first video wall and the second video wall, respectively, based on the information of the region, to generate first mapping information and second mapping information so that respective separate images output from the first video wall and the second video wall are displayed as a single image.

The IP wall controller may include a first IP wall controller and a second IP wall controller, and the video wall security method may further include transmitting, by the first gateway and the second gateway, the first mapping information and the second mapping information to the first IP wall controller and a second wall IP controller, respectively, controlling, by the first IP wall controller, the first video wall to load a first portion of the video stream based on the first mapping information, and controlling, by the second IP wall controller, the second video wall to load a second portion of the video stream based on the second mapping information.

The gateway may include gateways, and the video wall security method may further include respectively processing, by the gateways, different types of layout setting information for layout types of the video wall.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
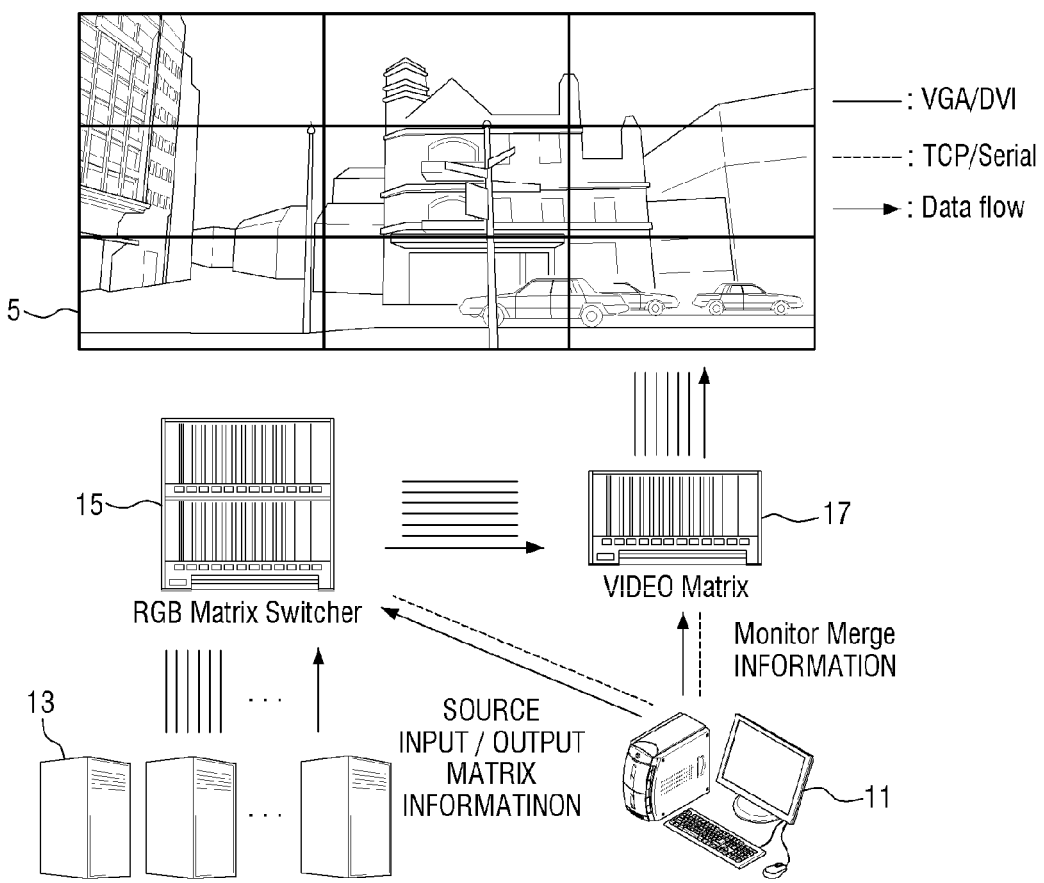
FIGS. 1 and 2 are schematic diagrams each illustrating a configuration of a related art video wall system.
Figure 2:
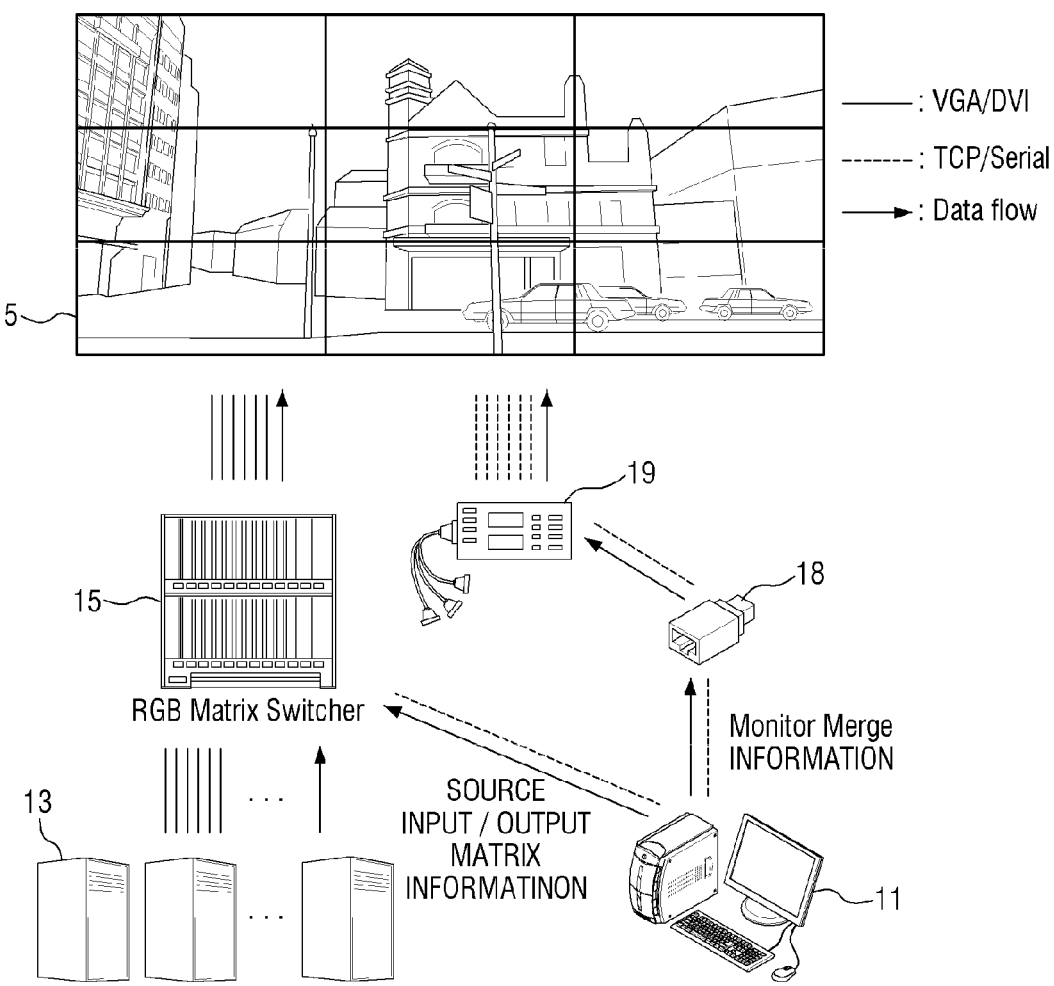

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

The use of the terms "a" and "an" and "the" and similar referents in the context of describing the exemplary embodiments (especially in the context of the following claims) are to be construed to cover both the singular and the plural, unless otherwise indicated herein or clearly contradicted by context. The terms "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 3:
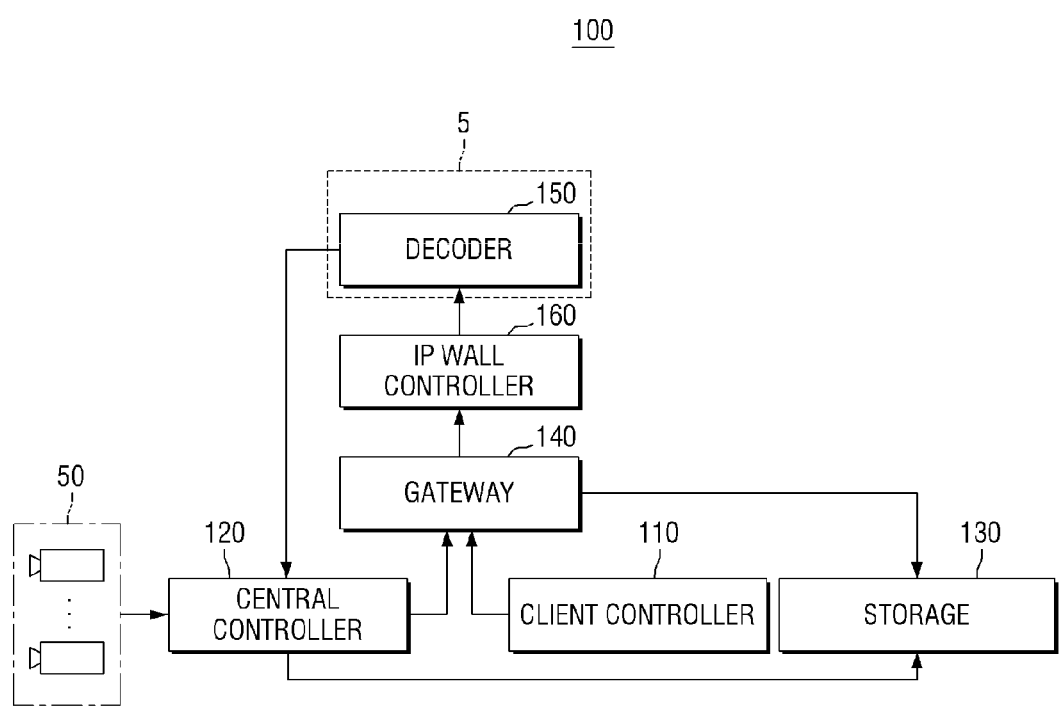
FIG. 3 is a block diagram schematically illustrating a configuration of a video wall security system according to an exemplary embodiment.

FIG. 3 is a block diagram schematically illustrating a configuration of a video wall security system 100 according to an exemplary embodiment.

As illustrated in FIG. 3, the video wall security system 100 according to an exemplary embodiment includes a client controller 110, a central controller 120, a gateway 140, a decoder 150 and an IP wall controller 160.

The client controller 110 controls the video wall 5 including a plurality of screens, and one or more client controllers 110 may control the layout of the video wall 5.

The central controller 120 obtains and stores an identifier (e.g., unique identification (UID) of a camera) of a camera and the video stream from a monitoring system 50 including at least one or more cameras, and may control the layout of the video wall 5. Here, the monitoring system 50 is connected to the plurality of video generation devices including a network camera or a local camera to communicate therewith.

The gateway 140 receives the layout setting information from the one or more client controllers 110 or one or more central controllers 120. The gateway 140 stores the changed layout setting information or status information in a storage 130, when the layout of the video wall 5 changes by the one or more client controllers 110 or the one or more central controllers 120. Therefore, the gateway 140 may load the changed layout setting information stored in the storage 130.

The gateway 140 processes the changed layout setting information into mapping information (e.g., the position of the screen on the video wall 5 and agent information mapped thereto (position information of image providing source)) that represents which types of video stream is regenerated and displayed on the screen (viewer) on the video wall 5, according to the request of the IP wall controller 160, and provides the mapping information to the wall controller 160. These functions may be performed by an IP wall proxy that is mounted in the gateway 140.

The IP wall controller 160 requests the image streaming information from the central controller 120 and the media gateway, based on the mapping information received from the gateway 140.

Although the video stream is transmitted to each screen on the video wall 5 from the central controller 120 and the media gateway, because the video stream is normally transmitted in the encoded format, to actually display the image on the screen from this, the decoder 150 is used. Because the decoder 150 may be provided with various codecs corresponding to the type of the video stream, the decoder 150 is provided in the gateway 140 in the form of a virtual matrix decoder, rather than being fixedly provided in the IP wall controller 160 or the screen driving device. Indeed, the gateway 140 may grasp the type of the codec of the video stream to be transmitted to a screen, depending on the changed layout setting information.

At this time, the IP wall controller 160 transmits the video stream to each screen of the video wall 5, so that various screen configurations may be performed, and monitors and controls the transmission state of the system and the text of the transferred content in real time.

Here, the layout of the video wall 5 may include the monitor layouts displayed on each of the plurality of screens, and wall layouts displayed on all the plurality of screens. At this time, the plurality of screens is gathered to form the video wall 5. The monitor layout refers to a layout of image displayed in a single monitor, and the wall layout refers to the layout of the image displayed on all the screens. Further, the monitor layout may perform a multi-view function for displaying various images in a single monitor, and this is also referred to as a tile layout.

Furthermore, the layout of the video wall 5 according to an exemplary embodiment may add a new layout type, without being limited to three types of the screen, wall and the tile layouts. For example, a free layout may be added, which refers to a layout that can be freely set, without being restricted to bezel of the screen. In the video wall security system 100 according to an exemplary embodiment, because a single IP wall controller 160 is formed, it may be further simplified, and the user's convenience may be improved as compared to a conventional system in which a plurality of separate modules is provided. Further, because the IP wall controller 160 is integrated into a single body, when the layout changes, it is possible to immediately reflect the change, limitation to the implementation of the layout is released by internal software, and further various layout may be set. Therefore, it is possible to achieve the above-mentioned free layout. This will be described below in detail.

The video wall security system according to an exemplary embodiment may provide a spot function of a plurality of layouts, and a security monitoring personnel may install, setup and apply the system through the spot function. Because a situation occurring on any screen is accurately determined and reported, it is possible to expect an effect in which situation awareness effect is improved. Furthermore, it is also possible to add other layouts desired by a user, in addition to the type of the above-mentioned layouts.

Figure 4:
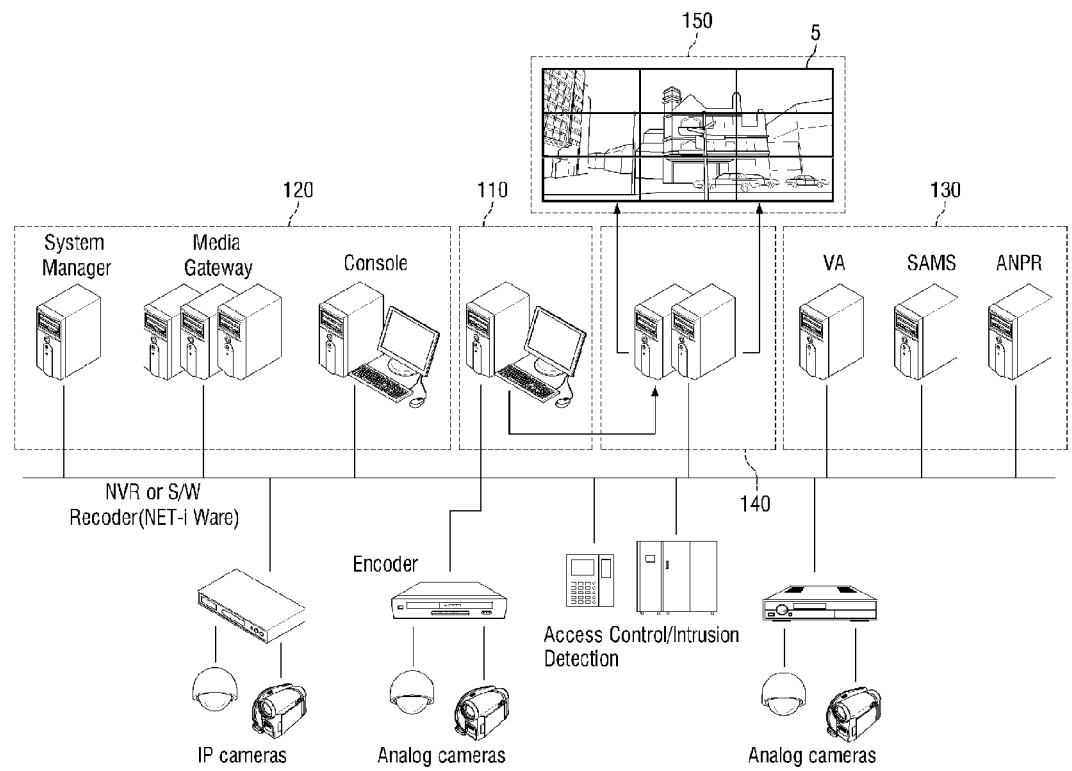
FIG. 4 is a block diagram illustrating a structure of a project as a base of a video wall security system according to an exemplary embodiment.
Figure 5:
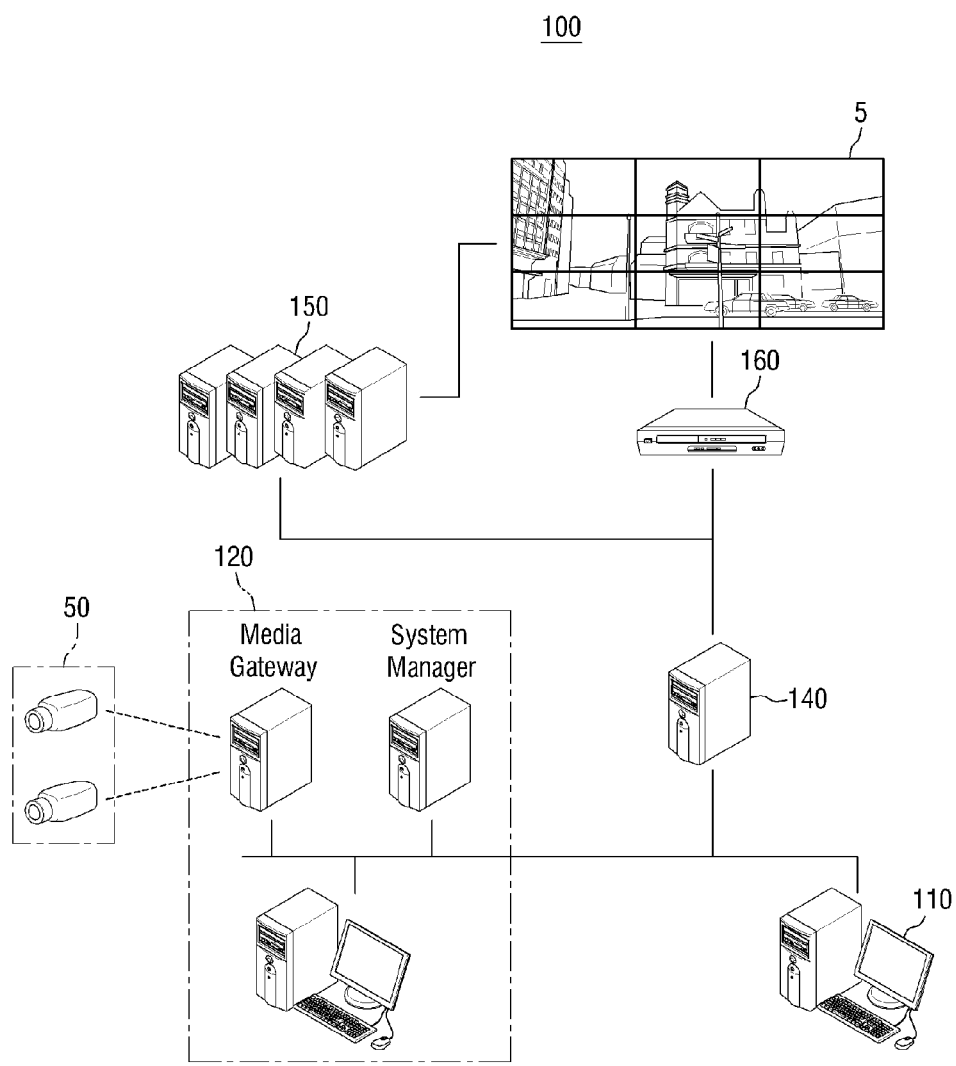
FIG. 5 is a schematic diagram illustrating a configuration of a video wall security system according to an exemplary embodiment.

FIG. 4 is a block diagram illustrating a structure of a project as a base of a video wall security system according to an exemplary embodiment, and FIG. 5 is a schematic diagram illustrating a configuration of the video wall security system 100 according to an exemplary embodiment.

Figure 6:
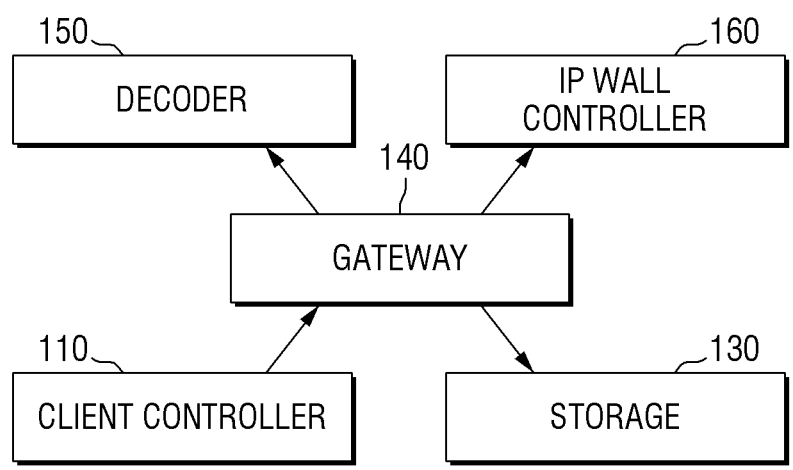
FIG. 6 is a block diagram illustrating a connection relation of a gateway in a video wall security system according to an exemplary embodiment.
Figure 7:
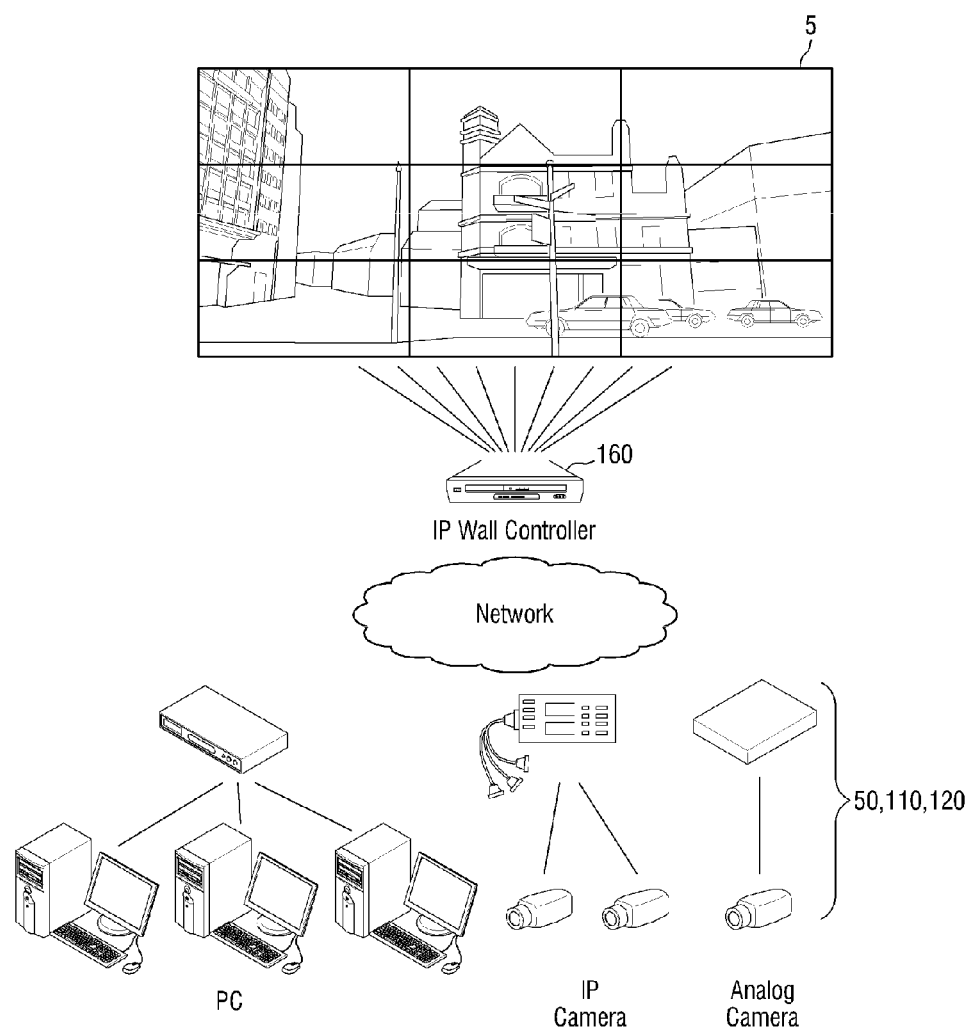
FIG. 7 is a schematic diagram illustrating a configuration of a video wall security system according to another exemplary embodiment.

Further, FIG. 6 is a block diagram illustrating a connection relation of the gateway 140 in a video wall security system according to an exemplary embodiment, and FIG. 7 is a schematic diagram illustrating a configuration of a video wall security system according to another exemplary embodiment Referring to FIGS. 4 to 7, the client controller 110 includes software used by an end user, and the end user may control the video wall 5 using the software.

The central controller 120 may include a management software that can manage the image monitoring products, such as an IP camera, an analog camera, an encoder, a digital video recorder (DVR), an network video recorder (NVR) and an S/W Recorder connected to the network in a unified platform. It is possible to connect a plurality of monitors for each PC using the software.

The central controller 120 may include a system manager, an image streaming server (Media Gateway) and the like, and an access to other devices, such as a network cameras, may be facilitated, using these components.

Thus, the video wall security system according to another exemplary embodiment may be developed as a scenario that can be interlocked in accordance with the central controller 120 capable of managing the image monitoring products in a unified platform.

The storage 130 may store the changed layout setting information, when the layout setting information of the video wall 5 is changed by the client controller 110 or the central controller 120. Because the changed layout setting information passes through the gateway 140, each of the client controller 110 and the central controller 120 may control the decoder 150.

As illustrated in FIG. 6, the gateway 140 serves as an intermediation so that the central controller 120 and the plurality of client controllers 110 may simultaneously control the video wall 5 and the decoder 150. That is, the central controller 120 and the plurality of client controllers 110 are adapted to communicate with each other via the gateway 140.

Referring again to FIGS. 4 to 7, the decoder 150 performs the function of a decoder that includes a codec software that serves to display the image information on the screen so that a person can recognize by decompressing the compressed image information. Further, the decoder 150 may further include software that performs the video control on the video wall 5 screen.

The maximum thirteen-six software can be interlocked in a single video wall and may provide at least 25 division image streams to each monitor. At this time, the decoder 150 may freely apply an image, while communicating with the gateway 140, and may be designed so that various events can be interlocked with each other.

The IP wall controller 160 transmits the changed layout setting information received from the gateway 140 to each of a plurality of screens forming the video wall 5 so that various screen configurations are performed.

At this time, the IP wall controller 160 may monitor and control the transmission state of the changed layout setting information from the client controller 110 or the central controller 120 and the texts of the transmitted contents in real time. Further, the IP wall controller 160 may monitor and control the state in which the decoder 150 loads the camera identifier and the video stream from the central controller 120 in real time.

Also, the IP wall controller 160 may monitor and control the process in which the layout of the video wall 5 is changed by the client controller 110 or the central controller 120, or the process in which the changed layout setting information is stored in the storage 130 in real time, and may also monitor and control a process in which the gateway 140 is loaded the changed layout from the storage 130 in real time.

Thus, as the IP wall controller 160 is applied in this way, because an RGB matrix, a digital visual interface (DVI) matrix and a video matrix directly do not need to receive the supply of electrical signal from an image medium such as a camera to supply the signal to each of the plurality of screens as in the related art, as illustrated in FIG. 7, the number of lines connected to the screen forming the video wall 5 may decrease.

Further, it is possible to control the screen division and the entire monitor Merge (a function of merging the screen in the monitor unit)/Unmerge (an opposite function of the merge) states and the like by a single control, and people may control the video wall 5 in the control center. Further, as the number of monitors increases, the number of images capable of being expressed for each monitor increases, and it is also possible to support the Merge/Unmerge and a change in source, in addition to a change in image.

The operating relation of the video wall security system according to an exemplary embodiment capable of being configured in this way will be described as follows.

When the decoder 150 loads the camera identifier and the video stream from the video streaming server of the central controller 120, and the layout setting information of the video wall 5 is changed by the client controller 110 or the central controller 120, the changed layout setting information is stored in the storage 130.

When transmitting the layout setting information on the changed layout to the gateway 140 by the client controller 110 or the central controller 120, and when the gateway 140 receives the layout setting information, the changed layout is loaded to the gateway 140 from the storage 130.

Next, the gateway 140 transmits the changed layout to the decoder 150 via an IP wall controller 160, and thus, the decoder 150 changes the video wall 5 according to the changed layout and displays it on the screen.

In this case, because the IP wall controller 160 directly controls the layout received from at least one or more client controllers 110 and the central controller 120 and directly transmits the layout to each of a plurality of screens, the size adjustment of the screen window becomes free, the user's convenience may be improved accordingly, the sharpness of the screen may be improved, and the installation costs may be reduced with the simplification of components and wiring.

Here, as the IP wall controller 160 controls the decoder 150 through the gateway 140, a change in the video source and the image merge/unmerge are performed by a single control, and extensibility and flexibility of the monitor may be enhanced.

Through the control of the video wall 5, the real-time monitoring may be performed, and the security monitoring personnel may install, setup and apply the system in accordance with the characteristics of the site, and because a situation occurring on any screen is accurately determined and reported, it is possible to expect an improvement in the situation awareness effect.

Figure 8:
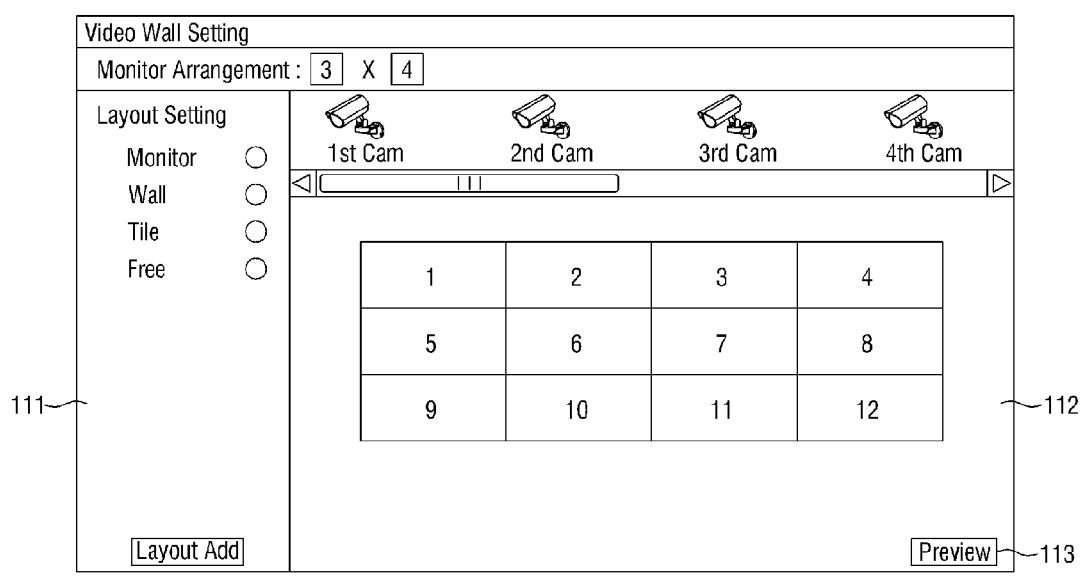
FIG. 8 is a view illustrating a graphical user interface (GUI) in a client module for setting a layout of a video wall, according to an exemplary embodiment.

FIG. 8 is a view illustrating a graphic user interface (GUI) in the client controller 110 for setting a layout of the video wall 5, according to an exemplary embodiment.

A software capable of setting the layout of the video wall 5 is installed in the client controller 110. A user may set the layout of the video wall 5 through the GUI of the software displayed on the screen of the client controller 110. As described above, the layout setting information of the video wall 5 may be changed in the client controller 110 via the software, and the changed layout setting information is transmitted to the gateway 140. As illustrated in FIG. 8, the client controller 110 controls the screen to display a layout setting portion 111 capable of being used to newly set the layout or change the layout setting, and an output position specifying portion 112 capable of being used to specify the image displayed on the video wall 5 and a regeneration position of the image to generate the mapping information in the gateway 140.

The layout setting portion 111 may be used to newly set the layout of the image or may be used to change the previously set layout, among the layouts of the video wall 5 according to an exemplary embodiment 4. As described above, the layout of the video wall 5 according to an exemplary embodiment may add a free layout type, without being limited to three types of the screen, wall and the tile layouts. Furthermore, a user may add a desired new layout type. The user may input the setting the layout form of the image through the layout setting portion 111.

When the output position specifying portion 112 is used to set the layout through the layout setting portion 111, the image may be output to the video wall 5 to specify the position to be regenerated.

The location to which the image is output is specified by the output position specifying portion 112, and the output position of the image, may be seen in advance before the image is actually output from the video wall 5. A preview button 113 is disposed on the screen, and a user may check an overall appearance in which the image is output through the client controller 110 in advance, by selecting the preview button 113.

Figure 9:
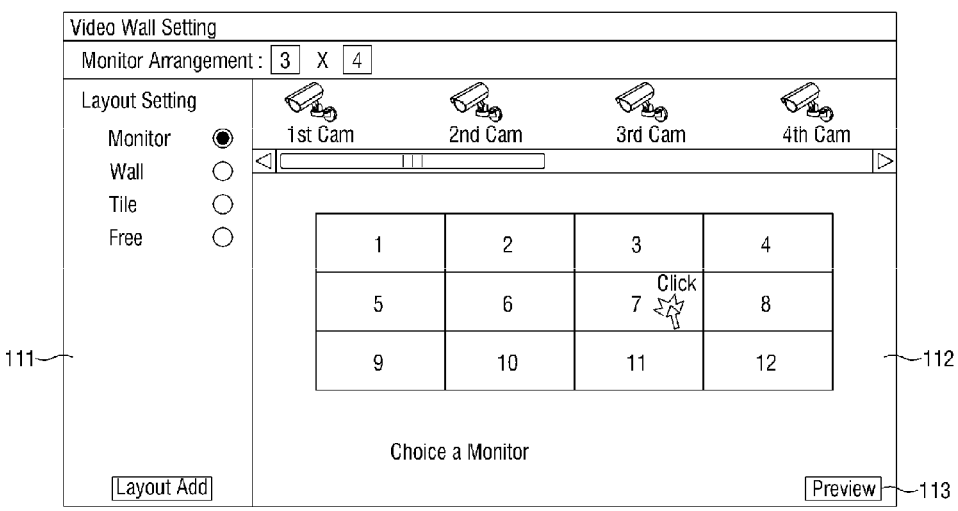
FIG. 9 is a view illustrating a case of selecting a monitor layout in the GUI of FIG. 8.
Figure 10:
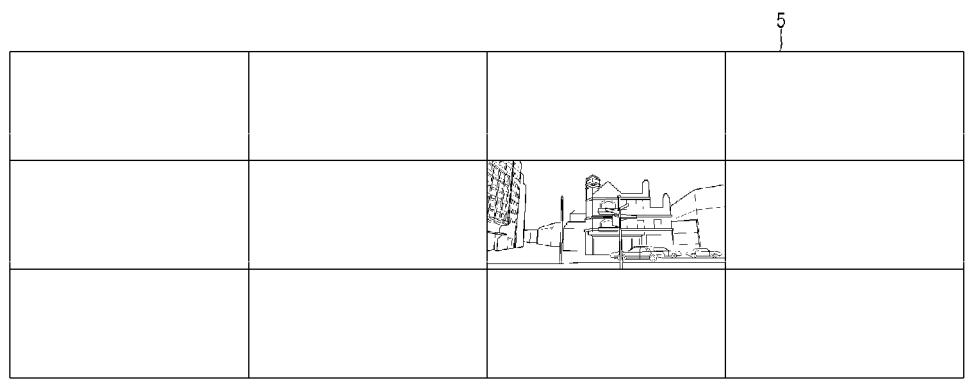
FIG. 10 is a view illustrating a position of an image that is output from the video wall, when selecting the monitor layout in FIG. 9.

FIG. 9 is a view illustrating a case of selecting the monitor layout in the GUI of FIG. 8, and FIG. 10 is a view illustrating a position of an image output from the video wall 5, when selecting the monitor layout in FIG. 9.

The monitor layout refers to the layout of the image displayed on a monitor. If a user selects the monitor layout in the layout setting portion 111, it is possible to select a single monitor to which the image is output, via the output position specifying portion 112.

For example, as illustrated in FIG. 9, when the monitors having the width and height of 3×4 form a single video wall 5, any identifier is used for each monitor. The identifier is an identifier for specifying the location to which the image is output, unlike the identifier of the camera that illustrates the origin of the image. The monitor forming the video wall 5 will be illustrated as being a monitor having the width and height of 3×4. When a user selects a seventh monitor from the 3×4 monitor, the identifier corresponding to the seventh monitor is transmitted to the gateway 140. The gateway 140 generates the mapping information based on the information. Further, the IP wall controller 160 receives the mapping information, grasps the origin of the image using the camera identifier, and grasps the position to be output through the monitoring identifier. Further, under the control of the IP wall controller 160, the monitor image corresponding to the number 7 among the monitors forming the video wall 5 is output to the video wall 5, as illustrated in FIG. 10.

Figure 11:
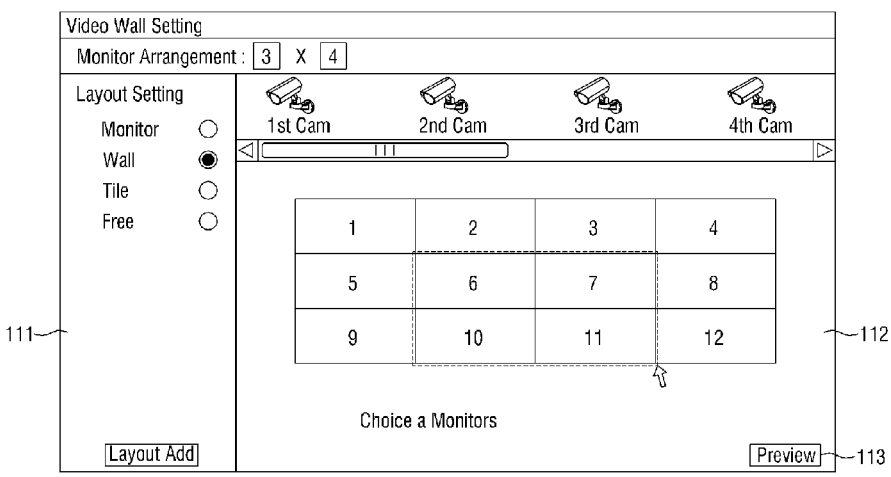
FIG. 11 is a view illustrating a case of selecting a wall layout in the GUI of FIG. 8.
Figure 12:
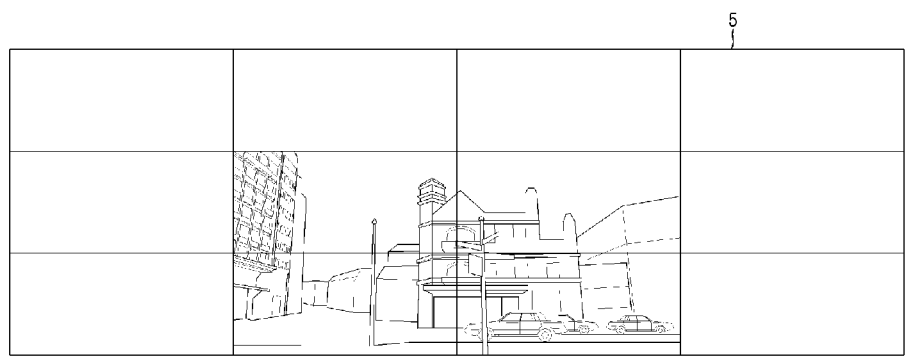
FIG. 12 is a view illustrating a position of an image output from the video wall, when selecting the wall layout in FIG. 11.

FIG. 11 is a view illustrating a case of selecting the wall layout in the GUI of FIG. 8, and FIG. 12 is a view illustrating a position of an image output from the video wall 5, when selecting the wall layout in FIG. 11.

The wall layout refers to the layout of the image displayed on the plurality of monitors. If a user selects the wall layout in the layout setting portion 111, it is possible to select a plurality of monitors to which the image is output via the output position specifying portion 112. Although the selection of the monitor may be performed by clicking each of the monitors each time, it is also possible to perform Drag & Drop to generate a region that includes the monitors. Various methods may be selected without being limited as long as the plurality of monitors can be selected, and because the wall layout is designation of a range in which the image can be output, it may form a square. Therefore, the selection of the plurality of monitors may be performed by m×n (m and n are natural numbers).

For example, as illustrated in FIG. 11, when selecting the region to include the sixth, seventh, tenth and eleventh monitors, all the identifiers corresponding to the sixth, seventh, tenth and eleventh monitors are transmitted. Alternatively, an identifier corresponding to any one of the monitors among the identifiers corresponding to the sixth, seventh, tenth and eleventh monitors may be transmitted, and the information of the wall layout and the position information of the peripheral monitor adjacent to the one monitor may also be transmitted together. That is, the identifier of the six monitor, the information of the wall layouts of 2×2, the position information in which the position of the peripheral monitor is the right, the bottom and the right diagonal bottom of the sixth monitor may also be transmitted. Even if all the identifiers corresponding to the sixth, seventh, tenth and eleventh monitors are transmitted, the information in which the layout is the wall layout also may be transmitted. The reason is that, when there is no information on the layout, four monitor layouts that individually output the images from each of the sixth, seventh, tenth and eleventh monitors may also be formed. The information is transmitted to the gateway 140. The mapping information is generated based on the information in the gateway 140. Further, the IP wall controller 160 receives the mapping information, grasps the origin of the image using a camera identifier, and grasps the output position of the image through the monitoring identifier and other information. Further, under the control of the IP wall controller 160, as illustrated in FIG. 12, the image is output to the monitors corresponding to the sixth, seventh, tenth and eleventh monitors among the monitors forming the video wall 5.

Figure 13:
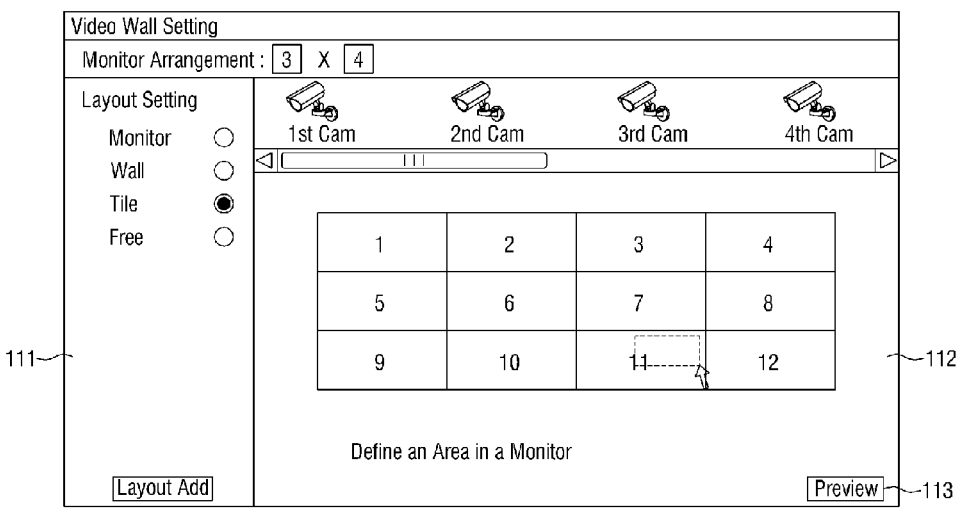
FIG. 13 is a view illustrating a case of selecting a tile layout in the GUI of FIG. 8.
Figure 14:
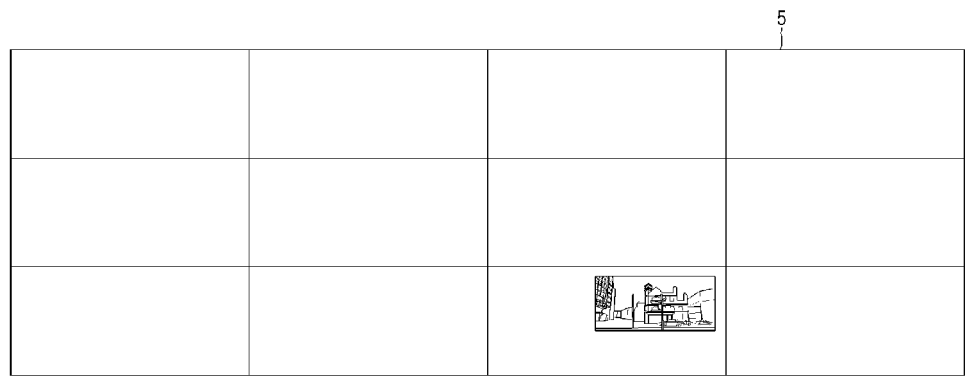
FIG. 14 is a view illustrating a position of an image output from the video wall, when selecting the tile layout in FIG. 13.

FIG. 13 is a view illustrating a case of selecting the tile layout in the GUI of FIG. 8, and FIG. 14 is a view illustrating a position of an image output from the video wall 5, when selecting the tile layout in FIG. 13.

The tile layout refers to the layout having the multi-view function that displays a plurality of images within a single monitor. If a user selects the tile layout in the layout setting portion 111, a region may be specified in the monitor to which the image is output, via the output position specifying portion 112. The designation of the region may perform drag & drop to generate a region in the monitor to which the image is output. However, as long as it is possible to specify the region in the monitor, various methods may be used, without being limited thereto.

For example, when specifying an arbitrary region in the eleventh monitor as illustrated in FIG. 13, the identifier corresponding to the eleventh monitor and the information on the arbitrary region may be transmitted to the gateway 140. The information on the arbitrary region may be coordinate information of the vertices of the region, and the information may also be the coordinate information of one vertex and the size information of the arbitrary region. The mapping information is generated based on the information in the gateway 140. Further, the IP wall controller 160 receives the mapping information, grasps the origin of the image through the camera identifier, and grasps the output position through the monitoring identifier. Then, under the control of the IP wall controller 160, as illustrated in FIG. 14, the image is output to the video wall 5, in the arbitrary region specified in the monitor corresponding to the eleventh monitor among the monitors forming the video wall 5.

Figure 15:
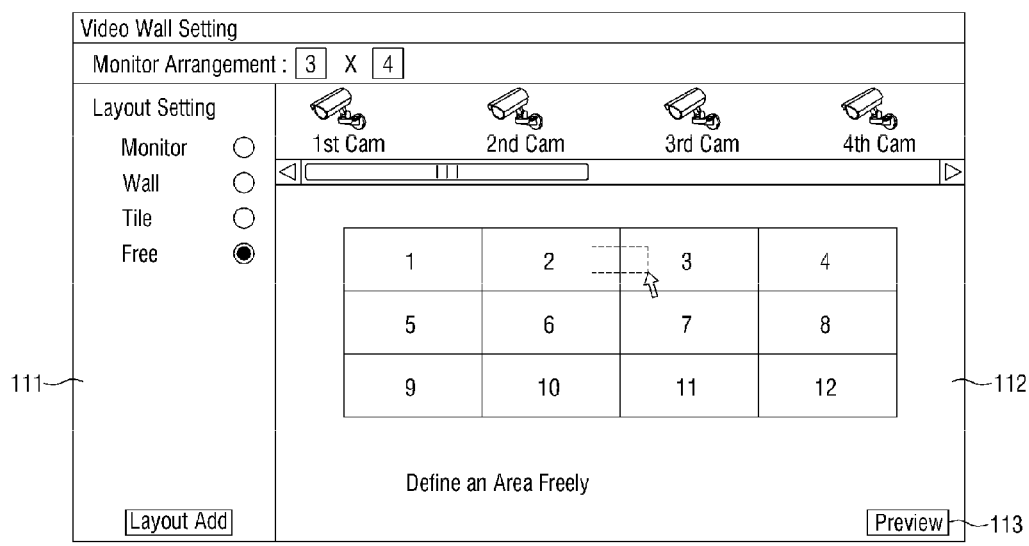
FIG. 15 is a view illustrating a case of selecting a free layout in the GUI of FIG. 8.
Figure 16:
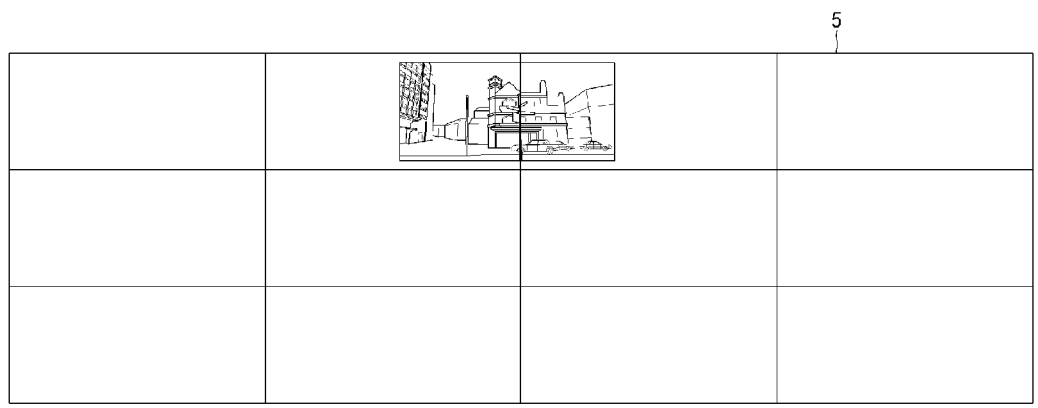
FIG. 16 is a view illustrating a position of an image output from the video wall, when selecting the free layout in FIG. 15.

FIG. 15 is a view illustrating a case of selecting the free layout in the GUI of FIG. 8, and FIG. 16 is a view illustrating a position of an image output from the video wall 5, when selecting the free layout in FIG. 15.

The free layout refers to a layout that can be freely set, without being restricted to the bezel of the monitor. If a user selects a free layout in the layout setting portion 111, the region to which the image is output may be set in the output position specifying portion 112. The designation of the region may perform the drag & drop to generate a region over a plurality of monitors to which the image is output. However, as long as it is possible to specify the region over a plurality of monitors, various methods may be used, without being limited thereto.

For example, as illustrated in FIG. 15, when specifying the arbitrary region over the second and third monitors, the identifier corresponding to the second monitor, the information on the arbitrary region in the second monitor, the identifier corresponding to third monitor, and the information on the arbitrary region in the third monitor are transmitted to the gateway 140. The information on the arbitrary region may be the coordinate information of the vertices of the region, and may be the coordinate information of the one vertex and the size information of the arbitrary region. The mapping information is generated based on the information in the gateway 140. Further, the IP wall controller 160 receives the mapping information, grasps the origin of the image through the camera identifier, and grasps the output position through the monitoring identifier. Also, under the control of the IP wall controller 160, as illustrated in FIG. 16, the image is output to the video wall 5 in the specified arbitrary region over the monitors corresponding to the second and third monitors among the monitors forming the video wall 5.

Figure 17:
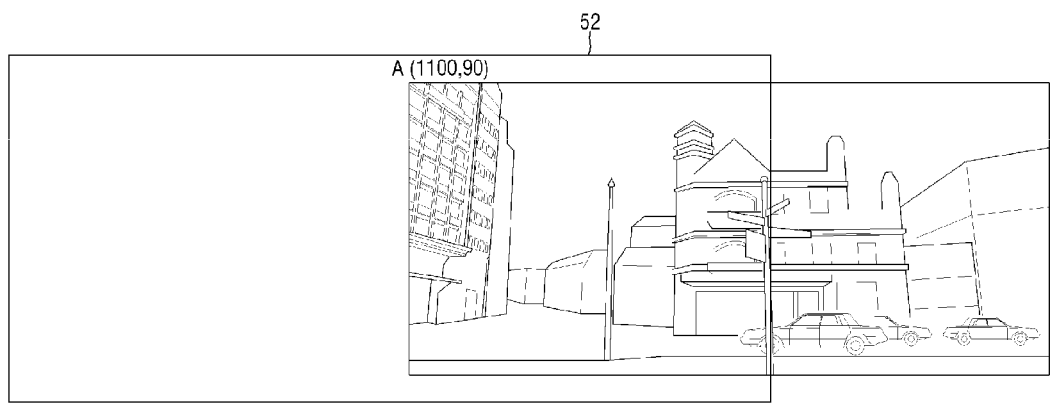
FIGS. 17 and 18 are views illustrating a method in which an image is output from the video wall, when selecting the free layout in FIG. 15.
Figure 18:
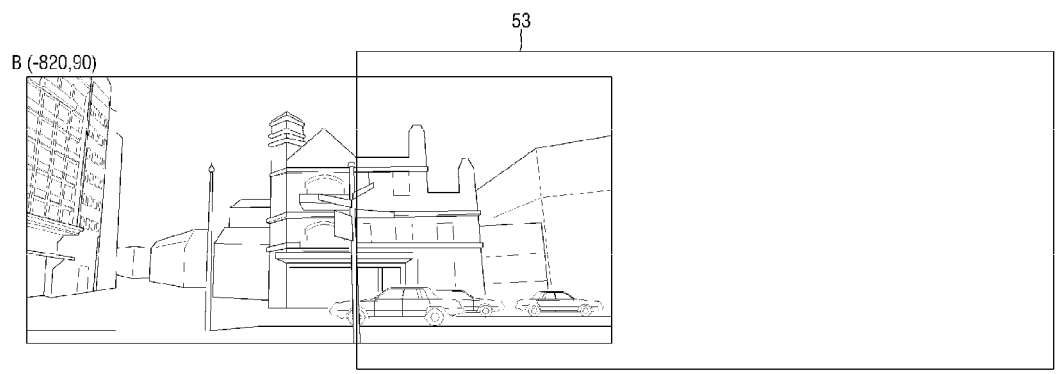

FIGS. 17 and 18 are views illustrating a method in which an image is output from the video wall 5, when selecting the free layout in FIG. 15.

For example, the information on the arbitrary region is assumed to be the coordinate information of one vertex and the size information of the any region. Further, the coordinate information of the one vertex is assumed to be the coordinate information of the left upper vertex in the arbitrary region. The coordinates of the vertices of the region may determine the coordinates, by generating the virtual orthogonal two axes for each monitor, and by specifying the arbitrary interval. However, in an exemplary embodiment, because the coordinate information of one vertex is referred to as the coordinate information of the left upper vertex of the arbitrary region, the origin of the coordinate is determined by the left upper vertex of each monitor. Further, as the interval between each coordinate is narrow, it is possible to more accurately represent the position of the arbitrary region. In this example, the positions of each pixel correspond to the coordinates. Thus, in an exemplary embodiment, if the monitor resolution is 1920×1080, the coordinates of the horizontal axis of 1920 and the vertical axis of 1080 may be set. However, as long as it is possible to set the origin of the coordinate and the interval of the coordinates, it is possible to use various methods, without being limited thereto.

The identifier corresponding to an second monitor 52 in the client controller 110 and the information on the arbitrary region in the second monitor 52 are transmitted to the video wall 5 via the gateway 140 and the IP wall controller 160. At this time, the second monitor 52 receives the transmission of information on the arbitrary region. As illustrated in FIG. 17, when the coordinate information of the vertex is A (1100, 90), the coordinates corresponding to A (1100, 90) in the second monitor 52 becomes the coordinates of the left upper vertex of the arbitrary region. Further, as illustrated in FIG. 17, the arbitrary regions are formed on the right and bottom based on the coordinates, according to the size information. The arbitrary regions are formed only at the positions at which the video wall 5 is present, and the layout is formed along the formed arbitrary region. Further, the image is output in accordance with the layout. Accordingly, as illustrated in FIG. 17, the image may not be practically output in a region deviated to the right of the video wall 5.

The identifier corresponding to a third monitor 53 in the client controller 110 and the information on the arbitrary region in the third monitor 53 are transmitted to the video wall 5 via the gateway 140 and the IP wall controller 160. At this time, as illustrated in FIG. 18, the third monitor 53 receives the transmission of information on the arbitrary region. When the coordinate information of the vertex is B (−820, 90), the coordinates corresponding to B (−820, 90) in the third monitor 53 becomes the coordinates of the left upper vertex of the arbitrary region. Further, as illustrated in FIG. 18, the arbitrary regions are formed on the right and bottom based on the coordinates, according to the size information. The arbitrary regions are formed only at the positions at which the video wall 5 is present, and the layout is formed along the formed arbitrary region. Further, the image is output in accordance with the layout. Accordingly, as illustrated in FIG. 18, the image may not be practically output in a region deviated to the right of the video wall 5b.

When the images are output from each of the second monitor 52 and the third monitor 53 in the above-described manner, the images visually displayed from the outside have a free layout that can be freely set, without being restricted to the bezel of the monitor, as illustrated in FIG. 16.

Figure 19:
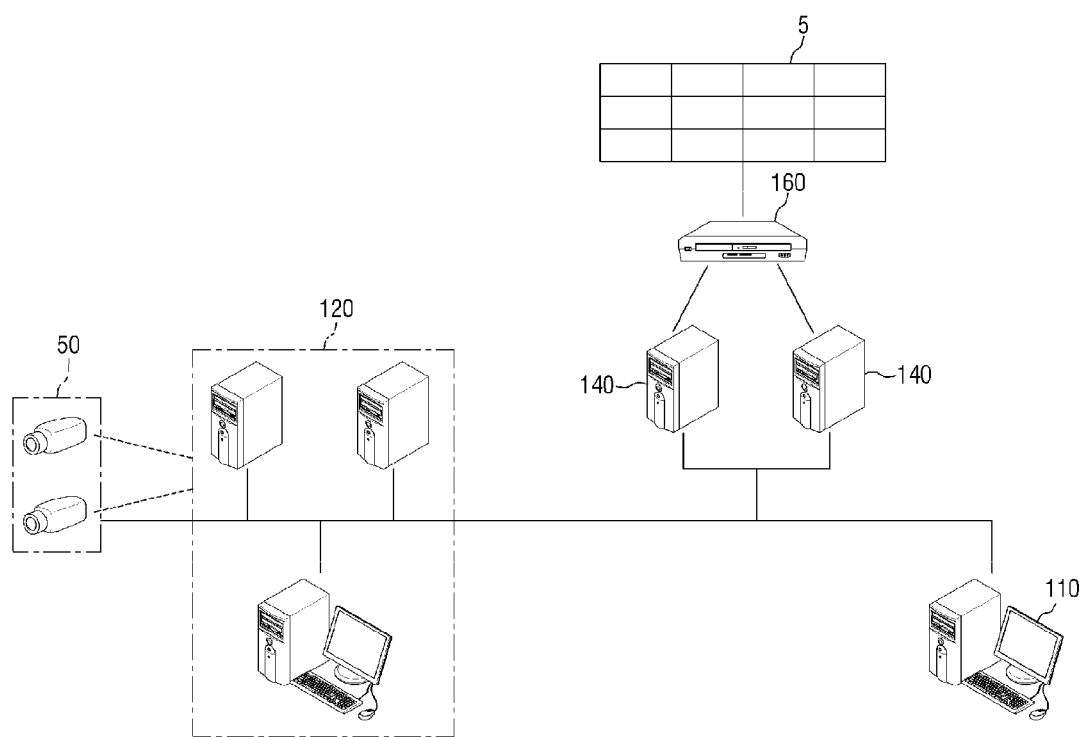
FIG. 19 is a schematic diagram illustrating a configuration for achieving multiple layouts, by a video wall security system according an exemplary embodiment.

FIG. 19 is a schematic diagram illustrating a configuration for achieving several layouts, by the video wall security system, according to an exemplary embodiment.

As described above, in the case of the monitor layout, the identifier of the selected monitor is transmitted to the gateway 140. Further, in the case of the wall layout, all the plurality of selected identifiers of the monitor is transmitted, or one monitor identifier and the peripheral monitor position information of the one monitor is transmitted. In the case of the tile layout, the one monitor identifier and the position coordinates in which the layout of the monitor is formed are transmitted. In the case of the free layout, the identifiers of each of the monitors to which the images are output, and the information of each arbitrary region to which the image is output in the monitor are transmitted. In this way, for each layout type, the information transmitted from the client controller 110 differs, and the method of processing the information also differs. To quickly handle such information, the gateway 140 is a multi-gateway 140. The multi-gateway 140 may include a plurality of gateways 140 configured together to process the information of different layouts for each type of the layout. As illustrated in FIG. 19, in the multi gateway 140, the plurality of gateways 140 may be separately formed, and a single gateway 140 may be formed to simultaneously process the plurality of functions. The single gateway 140 configured to process the information of one layout may quickly process the information of the layout, and the single gateway 140 is integrated to form the multi-gateway 140, which makes it possible to variously achieve the video wall 5 layout according to an exemplary embodiment.

Figure 20:
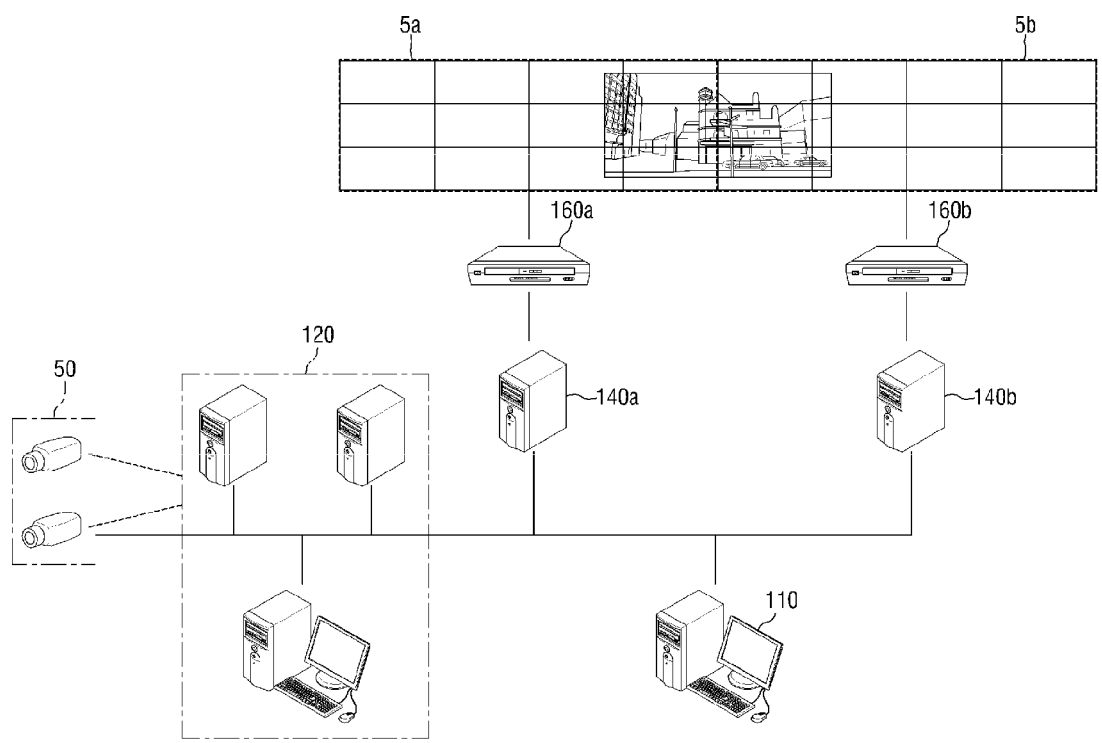
FIG. 20 is a block diagram illustrating a configuration for enlarging a video wall security system, according to an exemplary embodiment.
Figure 21:
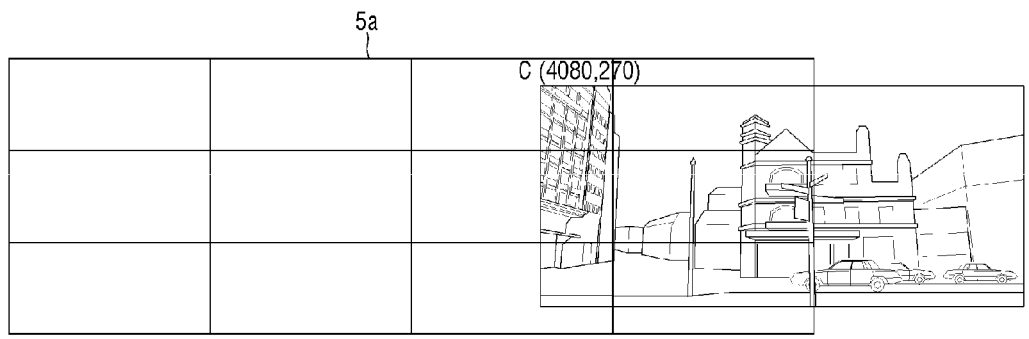
FIGS. 21 and 22 are views illustrating a method of mutually synchronizing a plurality of video walls to enlarge a video wall security system, according to an exemplary embodiment.
Figure 22:
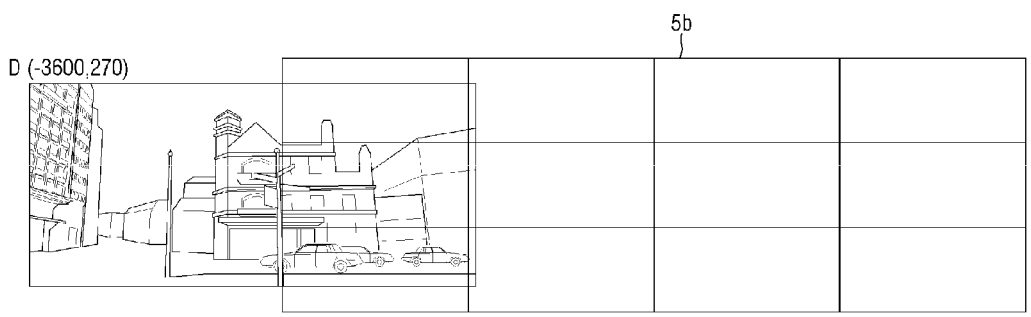

FIG. 20 is a block diagram illustrating a configuration for enlarging the video wall security system, according to an exemplary embodiment, and FIGS. 21 and 22 are views illustrating a method of mutually synchronizing a plurality of video walls 5a and 5b to enlarge the video wall security system, according to an exemplary embodiment.

The video wall security system according to an exemplary embodiment may achieve the video wall 5 only by a single IP wall controller 160. However, the number of monitors capable of being output from the one IP wall controller 160 is limited. For example, in a single main board included in the IP wall controller 160, the maximally seven graphics card slots are present. Further, the one graphics card occupies the two graphics card slots of the main board. Accordingly, maximally three graphics cards may be mounted on a single main board. Maximally four monitor output terminals may be formed in the single graphics card. Accordingly, a total of twelve monitors may be installed in a single main board. Although the above-described example relates to the main board and the graphics cards used for the IP wall controller 160 according to an exemplary embodiment, its numerical values may be variously modified. However, if the image is to be output from more monitors, the monitors may be additionally connected or a plurality of video wall security system may be installed. However, to additionally connect the monitors, the IP wall controller 160 may be replaced with a new model to install a large number of monitors. This uses excessive consumption of time or costs, and because the number of monitors capable of being installed in a single IP wall controller 160 is limited, it is not possible to indefinitely increase the monitors.

If the plurality of video wall security systems is installed, it is possible to indefinitely increase the number of monitors. However, because a boundary is formed between the video walls 5, the image is constrained at the boundary between the video walls 5. That is, the image cannot be immediately output via a plurality of video walls 5.

To solve this problem, first, as illustrated in FIG. 20, a plurality of video wall security systems according to an exemplary embodiment is installed. Hereinafter, the description will be given of a case in which the two or video wall security systems are installed, without being limited thereto. The monitors forming each of the first and second video walls 5a and 5b are assumed have the width and height are 3×4, and resolution of each of the monitors is assumed to be 1920×1080. As illustrated in FIG. 20, the first video wall 5a and the second video wall 5b are disposed in a row. That is, a total of twenty-four monitors combined by the twelve monitors forming the first video wall 5a and the twelve monitors forming the second video wall 5b are disposed so that the monitors are viewed as forming a single new video wall 5. Further, the first video wall 5a is connected to a first IP wall controller 160a, and the second video wall 5b is connected to a second IP wall controller 160b. Thus, the first video wall 5a is controlled by the first IP wall controller 160a, and the second video wall 5b is controlled by the second IP wall controller 160b. Further, a video stream of an image is applied to each of the first and second IP wall controllers 160a and 160b from the central controller 120 in accordance with the command signal of the client controller 110. Then, each of a first gateway 140a and a second gateway 140b sets the separate types of mapping information, in accordance with the layout setting information of the client controller 110. Further, the first and second gateways 140*a* and 140*b* serve as a so-called multi-server that calculates and reports the information on each coordinate movement to the first and second IP wall controllers 160*a* and 160*b* so that the image is synchronized. The layout setting information may include information on the coordinates of the vertices of the arbitrary region in which the layout is formed. Alternatively, the layout setting information may include the coordinate information of one vertex and the size information of the arbitrary region.

The layout setting information is assumed to include the coordinate information of one vertex and the size information of the arbitrary region. Further, the one vertex is assumed as the left upper vertex of the arbitrary region.

The information on the arbitrary region is transmitted to the first video wall 5*a* in the client controller 110 via the first gateway 140*a* and the first IP wall controller 160*a*. As illustrated in FIG. 21, the arbitrary region in which the layout is formed performs a coordinate movement in the first video wall 5*a*. If the moved coordinates is C (4080, 270), the coordinates corresponding to C (4080, 270) in the first video wall 5*a* becomes a left upper vertex coordinate of an arbitrary region. Further, the arbitrary region is formed on the right and bottom based on the coordinates, in accordance with the size information, as illustrated in FIG. 21.

The arbitrary region is formed only at a position at which the video wall 5*a* is present, and the layout is formed along the formed arbitrary region. Further, the image is output in accordance with the above layout. Therefore, as illustrated in FIG. 21, an image may not be practically output in a region deviated to the right of the video wall 5*a*.

Meanwhile, the information on the arbitrary region in the client controller 110 is transmitted to the video wall 5*b* via the second gateway 140*b* and the second IP wall controller 160*b*. As illustrated in FIG. 22, the arbitrary region in which the layout is formed performs a coordinate movement in the second video wall 5*b*. If the moved coordinates is D (−3600, 270), the coordinates corresponding to D (−3600, 270) in the second video wall 5*b* becomes a left upper vertex coordinate of an arbitrary region. Further, the arbitrary region is formed on the right and bottom based on the coordinates, in accordance with the size information, as illustrated in FIG. 22.

The arbitrary region is formed only at a position at which the video wall 5*b* is present, and the layout is formed along the formed arbitrary region. Further, the image is output in accordance with the above layout. Therefore, as illustrated in FIG. 22, an image may not be practically output in a region deviated to the left of the second video wall 5*b*.

As the calculation of the coordinate movement, when subtracting the horizontal coordinate value of D from the horizontal coordinate value of C, i.e., when calculating 4080−(−3600), 7680 is obtained. This is a value obtained by quadruple of 1920, and because a single video wall 5 has the horizontal axis that is identical to the four attached monitors, when performing the calculation as described above, the image is synchronized. However, the exemplary embodiments are not limited thereto, and the calculation method may vary, depending on various factors such as the monitor resolution, the arrangement of the plurality of video walls 5*a* and 5*b*, and a method for setting the coordinate intervals.

By performing the coordinate movement of each of the positions of the region to which the image is output by the above-described method in the first and second video walls 5*a* and 5*b*, the synchronization of the image is performed between the respective video walls 5*a* and 5*b*. As a result, a user practically recognizes the plurality of video walls 5*a* and 5*b* as a single video wall 5, and the image visually displayed from the outside is viewed as not being restrained on the boundary between the of the plurality of video walls 5*a* and 5*b*.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion.

At least one of the components, elements, modules or units represented by a block as illustrated in FIGS. 3 and 6 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video wall security system comprising at least one processor to implement:
a central controller configured to:
receive, from a monitoring system, a video stream and an identifier of a camera;
control a central display to display a first image corresponding to a video wall comprising a first display device and a second display device separate from the first display device; and
receive, from the central display, a first selection of a first portion of the first display device and of a second portion of the second display device, from the first image that is displayed;
a gateway configured to generate mapping information, based on the first portion of the first display device and the second portion of the second display device that are selected;
a decoder; and
an internet protocol (IP) wall controller configured to receive the mapping information from the gateway, and control the decoder to load the video stream, based on the identifier, in response to the mapping information being received,
wherein the decoder is configured to decode the video stream that is loaded, and
wherein the IP wall controller is further configured to, based on the mapping information, control the first portion of the first display device to display a first region of the video stream that is decoded, and control the second portion of the second display device to display a second region of the video stream that is decoded, while the first region of the video stream that is decoded is displayed, the second region of the video stream being separate from the first region of the video stream.

2. The video wall security system of claim 1, wherein the gateway is further configured transmit a codec to the decoder, and
wherein the decoder is further configured to decode the video stream that is loaded, based on the codec.

3. The video wall security system of claim 1, wherein the first portion of the first display device that is selected is an entire portion of the first display device, and
wherein the second portion of the second display device that is selected is an entire portion of the second display device.

4. The video wall security system of claim 1, further comprising a client controller configured to control a client display to display the first image corresponding to the video wall comprising the first display device and the second display device separate from the first display device, and receive, from the client display, a second selection of the first portion of the first display device and of the second portion of the second display device, from the first image that is displayed by the client display,
wherein the gateway is further configured to generate the mapping information, based on the first portion of the first display device and the second portion of the second display device that are selected via the client controller.

5. The video wall security system of claim 4, wherein the first portion of the first display device that is selected is less than an entire portion of the first display device, and
wherein the second portion of the second display device that is selected is less than an entire portion of the second display device.

6. The video wall security system of claim 5, wherein the client controller is further configured to transmit, to the gateway, a first identifier of the first display device, a second identifier of the second display device, and information of the first portion of the first display device and the second portion of the second display device that are selected, in response to the second selection being received, and
wherein the gateway is further configured to set first coordinates of the first portion of the first display device that is selected, and set second coordinates of the second portion of the second display device that is selected, based on the first identifier of the first display device, the second identifier of the second display device, and the information of the first portion of the first display device and the second portion of the second display device that are selected, to generate the mapping information so that the first region of the video stream and the second region of the video stream are displayed as a single image.

7. The video wall security system of claim 4, wherein the client controller is further configured to output a final image to be output from the video wall in advance, based on the first portion of the first display device and the second portion of the second display device that are selected via the client controller.

8. The video wall security system of claim 4, wherein the video wall comprises a first video wall and a second video wall that are arranged in a row,
wherein the gateway comprises a first gateway and a second gateway,
wherein the client controller is further configured to:
receive an input specifying a first area of the first video wall to which the first region of the video stream is to be output and a second area of the second video wall to which the second region of the video stream is to be output; and
transmit, to the first gateway and the second gateway, information of the first area and the second area that are specified, and
wherein the first gateway and the second gateway are further configured to set first coordinates of the first area of the first video wall that is specified, and set second coordinates of the second area of the second video wall that is specified, based on the information of the first area and the second area that are specified, to generate first mapping information and second mapping information, respectively, so that the first region of the video stream and the second region of the video stream are displayed as a single image.

9. The video wall security system of claim 8, wherein the IP wall controller comprises a first IP wall controller and a second IP wall controller,
wherein the first gateway and the second gateway are further configured to transmit the first mapping information and the second mapping information to the first IP wall controller and the second IP wall controller, respectively,
wherein the first IP wall controller is configured to control the first area of the first video wall to load the first region of the video stream, based on the first mapping information, and
wherein the second IP wall controller is configured to control the second area of the second video wall to load the second region of the video stream, based on the second mapping information.

10. The video wall security system of claim 1, wherein the gateway comprises gateways configured to respectively process different types of layout setting information for layout types of the video wall.

11. A video wall security method comprising:
receiving, by a central controller, a video stream and an identifier of a camera, from a monitoring system;
controlling, by the central controller, a central display to display a first image corresponding to a video wall comprising a first display device and a second display device separate from the first display device;
receiving, by the central controller, from the central display, a first selection of a first portion of the first display device and of a second portion of the second display device, from the first image that is displayed;
generating, by a gateway, mapping information, based on the first portion of the first display device and the second portion of the second display device that are selected;
receiving, by an internet protocol (IP) wall controller, the mapping information from the gateway;
controlling, by the IP wall controller, a decoder to load the video stream, based on the identifier, in response to the mapping information being received;
decoding, by the decoder, the video stream that is loaded;
controlling, by the IP wall controller, based on the mapping information, the first portion of the first display device to display a first region of the video stream that is decoded; and
controlling, by the IP wall controller, based on the mapping information, the second portion of the second display device to display a second region of the video stream that is decoded, while the first region of the video stream that is decoded is displayed, the second region of the video stream being separate from the first region of the video stream.

12. The video wall security method of claim 11, further comprising transmitting, by the gateway, a codec to the decoder, and
wherein the decoding comprises decoding, by the decoder, the video stream that is loaded, based on the codec.

13. The video wall security method of claim 11, wherein the first portion of the first display device that is selected is an entire portion of the first display device, and
wherein the second portion of the second display device that is selected is an entire portion of the second display device.

14. The video wall security method of claim 11, further comprising:
controlling, by a client controller, a client display to display the first image corresponding to the video wall comprising the first display device and the second display device separate from the first display device; and
receiving, by the client controller, from the client display, a second selection of the first portion of the first display device and of the second portion of the second display device, from the first image that is displayed by the client display,
wherein the generating the mapping information comprises generating the mapping information, based on the first portion of the first display device and the second portion of the second display device that are selected via the client controller.

15. The video wall security method of claim 14, wherein the first portion of the first display device that is selected is less than an entire portion of the first display device, and
wherein the second portion of the second display device that is selected is less than an entire portion of the second display device.

16. The video wall security method of claim 15, further comprising:
transmitting, by the client controller, to the gateway, a first identifier of the first display device, a second identifier of the second display device, and information of the first portion of the first display device and the second portion of the second display device that are selected, in response to the second selection being received; and
setting, by the gateway, first coordinates of the first portion of the first display device that is selected, and second coordinates of the second portion of the second display device that is selected, based on the first identifier of the first display device, the second identifier of the second display device, and the information of the first portion of the first display device and the second portion of the second display device that are selected, to generate the mapping information so that the first region of the video stream and the second region of the video stream are displayed as a single image.

17. The video wall security method of claim 14, further comprising outputting, by the client controller, a final image to be output from the video wall in advance, based on the first portion of the first display device and the second portion of the second display device that are selected via the client controller.

18. The video wall security method of claim 14, wherein the video wall comprises a first video wall and a second video wall that are arranged in a row,
wherein the gateway comprises a first gateway and a second gateway, and
wherein the video wall security method further comprises:
receiving, by the client controller, an input specifying a first area of the first video wall to which the first region of the video stream is to be output and a second area of the second video wall to which the second region of the video stream is to be output;
transmitting, by the client controller, to the first gateway and the second gateway, information of the first area and the second area that are specified; and
setting, by the first gateway and the second gateway, first coordinates of the first area of the first video wall that is specified, and second coordinates of the second area of the second video wall that is specified, based on the information of the first area and the second area that are specified, to generate first mapping information and second mapping information, respectively, so that the first region of the video stream and the second region of the video stream are displayed as a single image.

19. The video wall security method of claim 18, wherein the IP wall controller comprises a first IP wall controller and a second IP wall controller, and
wherein the video wall security method further comprises:
transmitting, by the first gateway and the second gateway, the first mapping information and the second mapping information to the first IP wall controller and the second IP wall controller, respectively;
controlling, by the first IP wall controller, the first area of the first video wall to load the first region of the video stream, based on the first mapping information; and controlling, by the second IP wall controller, the second area of the second video wall to load the second region of the video stream, based on the second mapping information.

20. The video wall security method of claim 11, wherein the gateway comprises gateways, and
wherein the video wall security method further comprises respectively processing, by the gateways, different types of layout setting information for layout types of the video wall.

* * * * *